July 29, 1924.
W. J. BARBER
CHILD'S VEHICLE
Filed Oct. 12, 1922    3 Sheets-Sheet 2
1,502,838
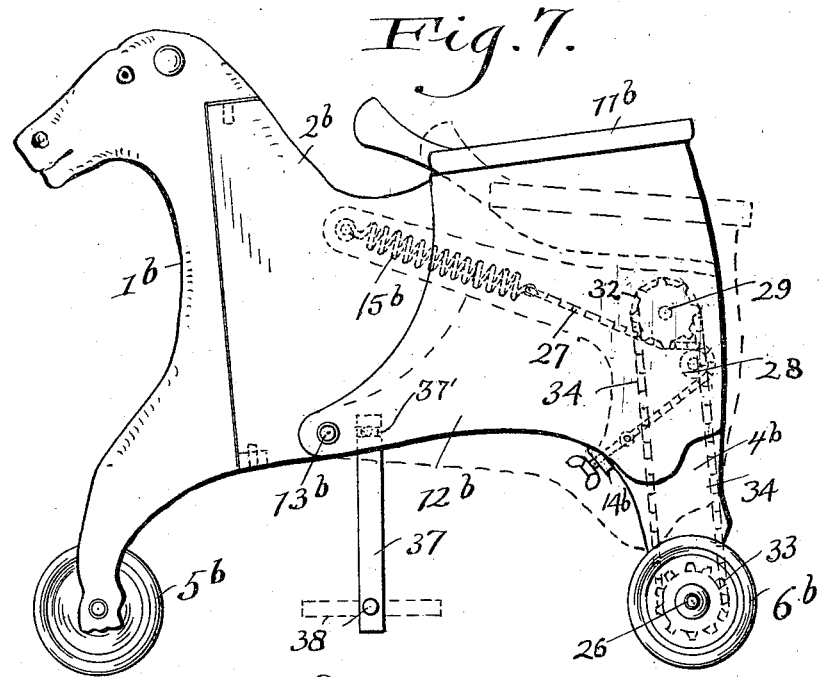

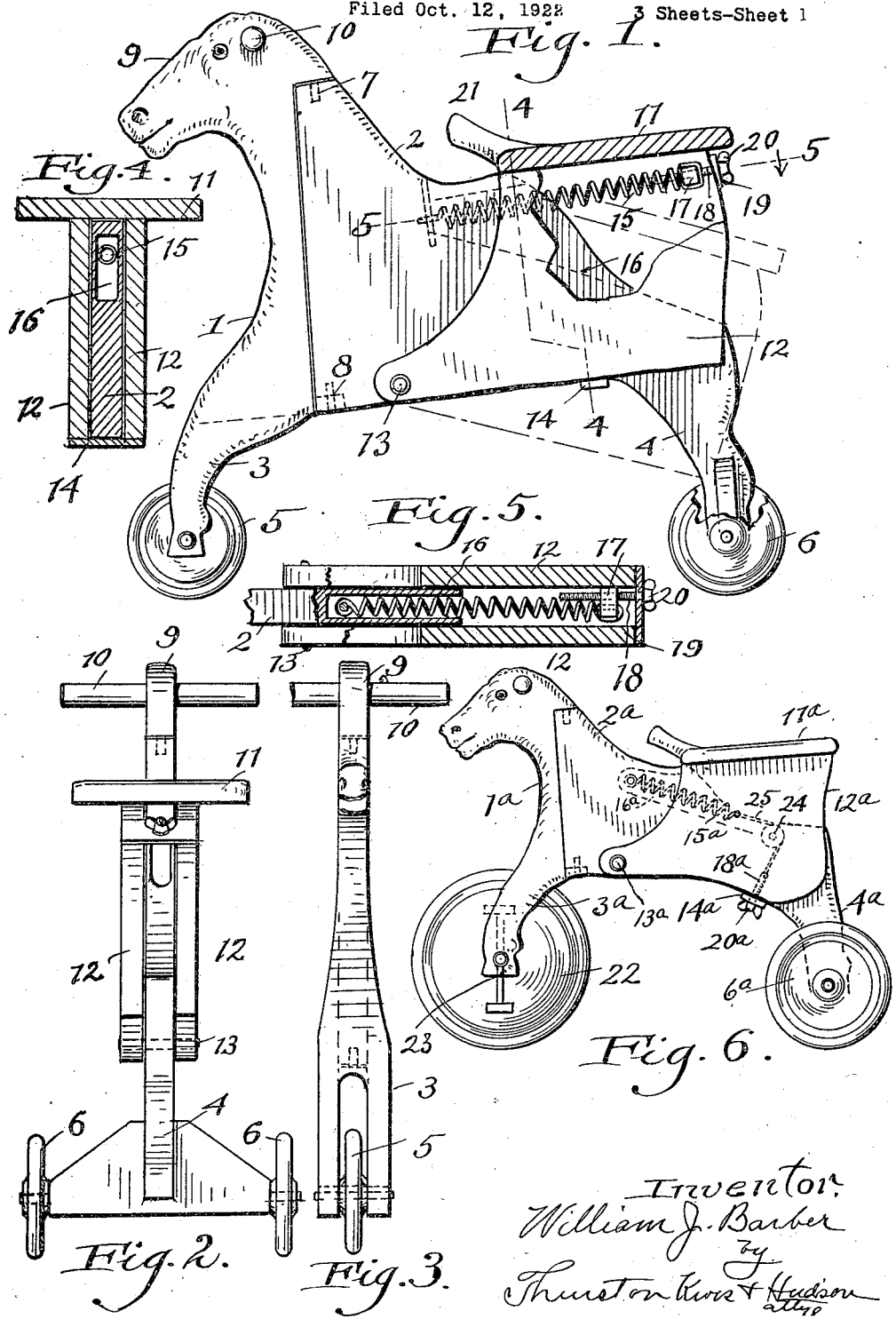

July 29, 1924.

W. J. BARBER

CHILD'S VEHICLE

Filed Oct. 12, 1922      3 Sheets-Sheet 3

1,502,838

Inventor
William J. Barber
Thurston Kwis & Hudson,
attys

Patented July 29, 1924.

1,502,838

UNITED STATES PATENT OFFICE.

WILLIAM J. BARBER, OF EAST CLEVELAND, OHIO, ASSIGNOR TO THE E. & N. MANUFACTURING COMPANY, OF CLEVELAND, OHIO, A CORPORATION.

CHILD'S VEHICLE.

Application filed October 12, 1922. Serial No. 594,036.

*To all whom it may concern:*

Be it known that I, WILLIAM J. BARBER, a citizen of the United States, residing at East Cleveland, in the county of Cuyahoga and State of Ohio, have invented a certain new and useful Improvement in Children's Vehicles, of which the following is a full, clear, and exact description.

This invention relates generally to vehicles for children and is applicable to vehicles in which the rider propels the vehicle by means of his feet on the ground or to vehicles of the pedal operated type, and in the preferred form includes a novel vehicle propelling mechanism.

It is an object of the invention to provide a teetering spring counterbalanced seat for the rider.

A further object is to provide in connection with the spring seat support, a spring tension adjusting device whereby the tension of the spring can be adjusted to counterbalance the weight of children of different sizes.

A further object is to provide means for propelling the vehicle from the teetering seat.

Other objects will be apparent from the following description in connection with the accompanying drawings.

Figure 12:
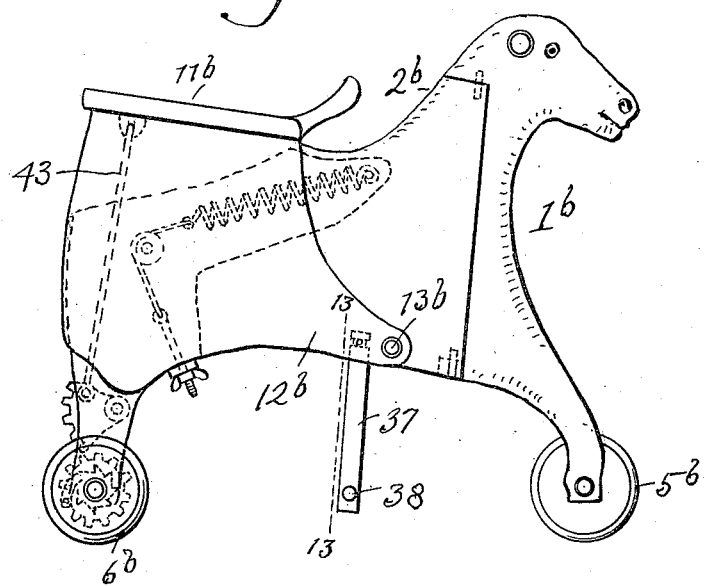
Figure 11:
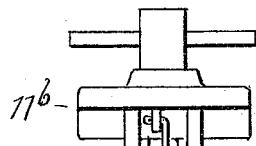
Figure 13:
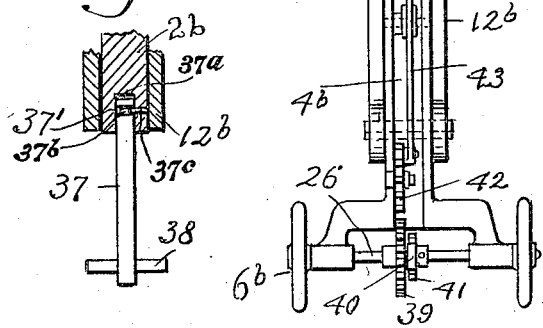

Reference should be had to the accompanying drawings in which Fig. 1 is a side elevation of the vehicle showing in full lines the teetering seat in normal elevated position and in dotted lines the seat in its lowermost position; Fig. 2 is a rear elevation of the vehicle; Fig. 3 is a fragmentary front elevation of the vehicle; Fig. 4 is a section on line 4—4 of Fig. 1; Fig. 5 is a section on line 5—5 of Fig. 1; Fig. 6 is a side elevation showing a modified form of the invention; Fig. 7 is a side elevation showing a further modification; Fig. 8 is a rear elevation of the vehicle shown in Fig. 7; Fig. 9 is a detail view of the pawl and ratchet for connecting the driving sprocket to the rear axle; Fig. 10 is a fragmentary view showing a modified form of driving connection between the movable seat and rear axle; Fig. 11 is a rear elevation of the vehicle equipped with the driving mechanism shown in Fig. 10; Fig. 12 is a side elevation of the vehicle equipped with the driving mechanism shown in Fig. 10; Fig. 13 is a vertical section on line 13—13 of Fig. 12 showing the rotatable connection between the adjustable foot rest and the body member.

Referring to the accompanying drawings, the body of the vehicle consists of front and rear sections 1 and 2 which are pivotally connected and have depending legs 3 and 4 which carry the supporting wheels 5 and 6. The front section 1 is recessed to receive the forward end of the rear section 2 and carries upper and lower pivot pins 7 and 8 by means of which the section 1 can swing about a vertical axis with respect to the rear section 2. The sections 1 and 2 of the body are preferably formed to represent the body of an animal and the front section 1 has a head portion 9 which projects above the rear portion 2 of the body and has attached thereto a steering handle 10.

The rear section 2 of the body carries a teetering seat which consists of a seat portion 11 and depending side portions 12 which extend downwardly and forwardly from the seat portion 11 upon opposite sides of the body portion 2. The side portions 12 are pivotally connected to the body portion 2 adjacent the front end thereof by means of a pivot pin 13 which extends through the front ends of the side members 12 and the body member 2. A cross member 14 connects the side portions 12 of the seat rearwardly of the pivot 13 and is engageable with the underside of the body member 2 to limit the upward movement of the seat. The teetering seat is normally held in elevated position by means of a counterbalance spring 15, the forward end of which is secured to the body member 2 at the inner end of an angular recess 16 adjacent the top thereof. The rear end of the spring 15 is connected to a suitable tension adjusting device, which as herein shown consists of a nut 17 on a bolt 18 which extends through a cross piece 19 connected to the rear edges of the side members 12 immediately beneath the rear end of the seat portion 11, said bolt 18 having a winged head 20 upon the outer side of the cross piece 19 by means of which it may be rotated to adjust the nut 17 along the length thereof to vary the tension on the spring 15. The rear end portion of the body member 2 is cut away to permit downward movement of the seat portion 11 and the seat portion 11 is provided at its forward end with a forwardly and upwardly projecting horn 21 which slides over the rear end of the recess 16 so that it is not possible for the rider to pinch his fingers between the forward edge of the seat 11 and the upper edge of the recess 16.

The teetering seat 11 is at convenient height above the ground so that the rider can straddle the seat with his feet upon the ground. The tension spring 15 will be adjusted so that it will almost but not quite counterbalance the weight of the rider. When the rider allows his full weight to rest upon the seat 11 the seat will swing downwardly to its lowermost position. When the rider transfers a portion of his weight to the ground for the purpose of propelling the vehicle forwardly the spring 15 will return the seat to its uppermost position.

In the modification shown in Fig. 6 the vehicle is provided with a body formed of sections 1a and 2a corresponding substantially to the sections 1 and 2 in the modification first described. The section 2a has a rear leg 4a which carries wheels 6a substantially as in the modification first described. The front forked leg 3a, however, carries a large wheel 22 to the hub of which are fixed pedals 23. The teetering seat in this modification is similar to that of the first modification and consists of a seat portion 11a and side members 12a pivoted to the lower forward portion of the body section 2a by means of a pivot 13a. Journaled in the body member 2a adjacent the rear end thereof and between the side members 12a of the seat is a pulley 24. The counterbalance spring 15a is connected at its forward end to the inner end of a recess 16a in the body member 2a and has a cable 25 attached to its rear end, said cable passing over the pulley 24 and being connected to a tension adjusting device carried by a cross member 14a connecting the side members 12a beneath the body section 2a. The tension adjusting device consists of a bolt 18a to which the cable 25 is attached, said bolt being mounted in the cross piece 14a connecting the lower edges of the side members 12a. The bolt 18a is connected at its inner end to the cable 25, has a threaded engagement with the cross piece 14a, and has a winged head 20a by means of which it can be rotated to adjust the tension of the spring. In this modification the rider can cause the seat to teeter as he operates the pedals 23 to propel the vehicle.

Figs. 7, 8, 9 and 10 show modifications in which the teetering seat is used to propel the vehicle. In these modifications the body is formed of front and rear sections 1b and 2b which are pivotally connected and carry supporting wheels 5b and 6b as in the modifications above described. In these modifications also, there is a teetering seat consisting of a seat portion 11b and depending side members 12b pivoted to the body member 2b by means of a pivot pin 13b and the rear wheels 6b are fixed to a rear axle 26 which is driven from the teetering seat by means which will be hereinafter described. Various driving connections between the movable seat and rear axle may be employed but it is desirable that the driving means be such that the forward movement of the vehicle is not interfered with and it is also desirable to permit the vehicle to move backwardly. I have shown herein two forms of driving mechanism, in one of which free forward movement of the vehicle is permitted and in the other of which free backward as well as forward movement is permitted.

In the modification shown in Figs. 7, 8 and 9, the counterbalance spring 15b is connected at its forward end to the body member 2b and has a sprocket chain 27 attached to its rear end which passes over a sprocket wheel 28 carried by the body member 2b at the rear end thereof and extends downwardly to a tension adusting device similar to that shown in Fig. 6 carried by the cross piece 14b connecting the side members 12b beneath the body 2b. Journaled above the sprocket chain 27 in the body member 2b is a transverse shaft 29 carrying a sprocket wheel 30 which engages the sprocket chain 27 and a second sprocket wheel 32 which rotates with the sprocket wheel 30. A sprocket wheel 33 is loosely mounted upon the axle 26 in alignment with the sprocket 32 and an endless sprocket chain 34 passes over the sprocket wheels 32 and 33. The rear portion of the body member 2b and the rear leg 4b are preferably hollow and form a housing for the sprockets 30 and 32 and the sprocket chain 34. Beside the loose sprocket wheel 33 on the shaft 26 is a fixed ratchet wheel 35 which is engaged by a spring pressed pawl 36 carried by the sprocket wheel 33. A foot rest. consisting of a vertical post 37, has its upper end rotatably secured at 37' in the body member 2b and has a cross piece 38 at its lower end upon which the feet of the rider may be placed, the rotatable connection 37' permitting the post 37 to be turned to position the cross piece 38 parallel with the body 2b when not in use. The post 37 has its upper end fitting within a recess 37a in a body and is provided with a groove 37b which receives a pin 37c carried by the body member.

In this modification the seat will have a rocking or teetering movement in the same manner as in the modifications first described. As the seat moves downwardly under the weight of the rider the sprocket wheel 30, shaft 29 and sprocket chain 34 will be rotated in a direction to propel the vehicle forwardly and by reason of the pawl and ratchet connection between the sprocket 33 and the axle 26 the rear wheels 6b will be driven to move the vehicle forwardly during the downward movement of the seat. When the rider removes a portion of his weight from the seat 11ᵇ the seat will be returned to its uppermost position by the spring 15ᵇ. During the return movement of the seat the sprocket 30, shaft 29 and sprocket chain 34 will be driven in a reverse direction. This reverse movement, however, is not communicated to the axle 26 since on rotation in the reverse direction the pawl 36 will ride over the teeth of the ratchet 35. The rider if he desires may turn the foot rest to a position in which the cross piece 38 is parallel with the body and propel the vehicle forwardly with his feet while the seat 11ᵇ is moving upwardly and if the forward speed due to the push given the vehicle by the rider is greater than that due to the downward movement of the seat at any time, the propelling mechanism will not interfere with the movement of the vehicle, since if the shaft 26 is rotating faster than the sprocket 33, the pawl 36 will ride over the teeth of the ratchet 35.

In the modification shown in Fig. 10 a gear 39 is loose upon the axle 26 and carries a pawl 40 engageable with the teeth of a ratchet 41 fixed to the shaft, a gear segment 42 is pivoted to the body above the gear 39 and a connecting rod 43 is connected at its lower end to segment 42 and at its upper end to the teetering seat 11ᵇ. As shown in the drawing when the seat 11ᵇ is in elevated position the segment 42 is out of engagement with the gear 39 so that the vehicle is free to move either forwardly or backwardly. When the seat moves downwardly under the weight of the rider the segment 42 engages the gear 39 and propels the vehicle forwardly. By reason of the pawl and ratchet connection between the gear 39 and the axle 26 forward movement of the vehicle independently of the driving mechanism is not interfered with.

Having described my invention, I claim—

1. In a child's vehicle, the combination with a body having supporting wheels, of a vertically swinging member pivoted at its forward end to the body carrying a seat, a tension spring for normally holding said member in elevated position, said spring being connected to the body above the pivotal connection and at its opposite end to the vertically swinging member and means for adjusting the tension of said spring.

2. In a child's vehicle, the combination with a body having supporting wheels, of a vertically swinging member carrying a seat and having a forwardly and downwardly extending portion pivoted to the body, and a tension spring connected at one end to said member at the rear of the pivot and at its opposite end to said body above the pivotal connection.

3. In a child's vehicle, the combination with a body having supporting wheels, of a vertically swinging member carrying a seat and having a forwardly and downwardly extending portion pivoted to the body, a tension spring for normally holding said member in elevated position, said spring having connections between its ends and the body and member, respectively, said spring being connected to the swinging member at the rear of the pivot, one of said connections being adjustable to vary the tension of the spring.

4. In a child's vehicle, the combination with a body having supporting wheels, of a vertically movable seat carried by the body, a tension spring interposed between the body and seat for moving the seat upwardly, means for limiting the upward movement of the seat, and means for adjusting the tension of the spring.

5. In a child's vehicle, the combination with a body having supporting wheels, of a vertically swinging member carrying a seat and having a forwardly and downwardly extending portion pivoted to the body, a coil spring having one end connected to the body above the pivotal connection, a cable connected to the opposite end of the spring, and means for adjustably connecting the cable to said member.

6. In a child's vehicle, the combination with a body having supporting wheels, of a seat mounted on said body for vertical movement with respect thereto, yielding means interposed between said body and seat for normally holding the seat in elevated position, means operated by the movable seat for propelling the vehicle, and means associated with the propelling means permitting free forward movement of the vehicle independently of the propelling means.

7. In a child's vehicle, the combination with a body having supporting wheels, of a seat mounted on said body for vertical movement with respect thereto, a spring interposed between the body and seat for moving the seat upwardly, said seat being movable in a downward direction against the spring by the weight of the rider, and means operable on downward movement of the seat to propel the vehicle, said propelling means being inoperative and permitting free continued movement of the vehicle during upward movement of the seat.

8. In a child's vehicle, the combination with a body having supporting wheels, of a propelling mechanism for said vehicle including a vertically movable spring actuated seat positioned upon the body to permit the rider to alternately apply weight to and remove weight from the seat to actuate the propelling mechanism, said propelling mechanism being operative during movement of the seat in one direction and permitting free movement of the vehicle in a forward direction during movement of the seat in the opposite direction.

9. In a child's vehicle, the combination with a body having supporting wheels, of a vertically swinging member carrying a seat and having downwardly and forwardly extending side portions forming guards on opposite sides of the body covering the space between the seat and body, said side portions being pivoted to the body at the forward ends thereof, a spring interposed between said body and member for normally holding said member in elevated position, and means adapted to be actuated upon downward movement of the member for propelling the vehicle.

10. A child's vehicle comprising a vertically disposed body member having front and rear legs, supporting wheels carried by said front and rear legs, a swinging member provided with a rear seat forming portion and side portions extending downwardly and forwardly from said seat portion on opposite sides of said body member and pivoted at their forward ends to said body member, a cross piece connecting said side portions beneath the body member and between the front and rear legs thereof, and a spring interposed between the body and swinging member for normally holding said swinging member in elevated position, said spring being positioned between the side portions of said swinging member.

11. A child's vehicle comprising a vertically disposed body member having front and rear legs carrying supporting wheels, a swinging member provided with a rear seat forming portion and side portions extending downwardly and forwardly from said seat portion on opposite sides of the body member and pivoted at their forward ends to the body member, a cross piece connecting said side portions beneath the body member and between the front and rear legs thereof, a spring positioned between the side portions of the swinging member, said spring having one end connected to the body member, a guide wheel on said body member beneath the seat portion of said swinging member, and a flexible member connected at one end to said spring and extending over said guide wheel and having its other end adjustably connected to said cross piece.

12. In a child's vehicle, the combination with a wheel supported body having a vertically movable spring counterbalanced seat thereon, of means for driving a wheel of the vehicle from the movable seat, said driving means being entirely disconnected from the wheel in one position of the seat.

13. In a child's vehicle, a body having supporting wheels, a vertically movable seat carried by said body, a counterbalance spring for normally holding said seat in an elevated position, means adapted to be operated by the movable seat for driving a wheel of the vehicle, said means being entirely disconnected from the wheel when the seat is in elevated position.

14. In a child's vehicle, a body having supporting wheels, a vertically movable spring counterbalanced seat adapted to move downwardly upon imposition of weight thereon, means operable upon downward movement of the seat to propel the vehicle forwardly, said vehicle being free to move backwardly or forwardly when said seat is in elevated position.

15. In a child's vehicle, a body having front and rear supporting wheels, a vertically movable seat carried by the body, a spring interposed between said seat and body and adapted to normally hold said seat in elevated position, a gear having a pawl and ratchet connection with certain of the supporting wheels, a pivoted gear segment meshing with said gear, said segment being movable into and out of engagement with said gear, and a connecting rod between said seat and segment, said segment being held out of engagement with said gear when the seat is in elevated position whereby the vehicle is free to move backwardly or forwardly.

In testimony whereof, I hereunto affix my signature.

WILLIAM J. BARBER.